(12) United States Patent
Ekster et al.

(10) Patent No.: US 10,767,369 B2
(45) Date of Patent: Sep. 8, 2020

(54) REINFORCED CONCRETE BUILDING STRUCTURES AND METHODS FOR MAKING SAME

(71) Applicant: EnviroBuilt Holdings, LLC, Trinity, FL (US)

(72) Inventors: Martin Ekster, Ash, NC (US); Matthew D Rader, Trinity, FL (US)

(73) Assignee: EnviroBuilt Holdings, LLC, Trinity, FL (US)

( * ) Notice: Subject to any disclaimer, the term of this patent is extended or adjusted under 35 U.S.C. 154(b) by 0 days.

(21) Appl. No.: 16/053,286

(22) Filed: Aug. 2, 2018

(65) Prior Publication Data
US 2020/0040574 A1 Feb. 6, 2020

(51) Int. Cl.
| | | |
|---|---|---|
| *E04C 2/38* | (2006.01) |
| *E04C 2/288* | (2006.01) |
| *E04B 1/14* | (2006.01) |
| *E04D 3/35* | (2006.01) |
| *E04C 2/52* | (2006.01) |

(Continued)

(52) U.S. Cl.
CPC ............ *E04C 2/384* (2013.01); *B32B 3/06* (2013.01); *B32B 3/30* (2013.01); *B32B 5/028* (2013.01); *B32B 5/245* (2013.01); *B32B 13/045* (2013.01); *B32B 21/047* (2013.01); *E04B 1/04* (2013.01); *E04B 1/14* (2013.01); *E04C 2/2885* (2013.01); *E04C 2/523* (2013.01); *E04D 3/352* (2013.01); *B32B 37/15* (2013.01); *B32B 2255/02* (2013.01); *B32B 2255/20* (2013.01); *B32B 2255/205* (2013.01); *B32B 2255/26* (2013.01); *B32B 2260/021* (2013.01); *B32B 2260/044* (2013.01); *B32B 2262/103* (2013.01); *B32B 2262/105* (2013.01); *B32B 2266/0228* (2013.01); *B32B 2305/022* (2013.01); *B32B 2305/07* (2013.01); *B32B 2305/08* (2013.01); *B32B 2305/38* (2013.01); *B32B 2307/3065* (2013.01); *B32B 2307/7145* (2013.01); *B32B 2307/7246* (2013.01); *B32B 2311/30* (2013.01); *B32B 2315/02* (2013.01); *B32B 2315/06* (2013.01); *B32B 2317/16* (2013.01);

(Continued)

(58) Field of Classification Search
CPC ........ E04C 2/384; E04C 2/2885; E04C 2/523; E04C 2/06; E04B 1/04; E04B 1/14; E04D 3/352
See application file for complete search history.

(56) References Cited

U.S. PATENT DOCUMENTS 4,454,702 A * 6/1984 Bonilla-Lugo ......... E04B 2/847
 52/251
4,669,240 A * 6/1987 Amormino ............... E04B 1/04
 264/253

(Continued)

OTHER PUBLICATIONS

Federal Emergency Management Agency, "Building Framing Systems and Best Practices," found at https://www.fema.gov/media-library-data/20130726-1708-25045-9326/chapter7.pdf (2013) 2013.

(Continued)

*Primary Examiner* — Brian D Mattei
(74) *Attorney, Agent, or Firm* — Eleanor M. Yost; Carlton Fields, PA

(57) ABSTRACT

Reinforced concrete structures and assemblies, building systems, and methods of fabrication.

49 Claims, 10 Drawing Sheets

(51) Int. Cl.
B32B 3/30 (2006.01)
B32B 5/02 (2006.01)
B32B 5/24 (2006.01)
B32B 3/06 (2006.01)
B32B 37/15 (2006.01)
B32B 13/04 (2006.01)
B32B 21/04 (2006.01)
E04B 1/04 (2006.01)

(52) U.S. Cl.
CPC ....... B32B 2325/00 (2013.01); B32B 2419/06 (2013.01); B32B 2607/00 (2013.01)

(56) References Cited

U.S. PATENT DOCUMENTS

| | | | | |
|---|---|---|---|---|
| 4,970,838 A * | 11/1990 | Phillips | .................... | E04B 1/04 52/250 |
| 5,313,753 A * | 5/1994 | Sanger | .................... | E04B 7/22 52/251 |
| 5,524,400 A * | 6/1996 | Schmechel | ............... | E04B 1/14 52/236.7 |
| 5,758,463 A * | 6/1998 | Mancini, Jr. | ............ | E04C 2/384 52/309.12 |
| 6,026,629 A * | 2/2000 | Strickland | ................. | E04C 2/06 52/309.11 |
| 6,101,779 A * | 8/2000 | Davenport | ................ | E04B 1/04 52/223.6 |
| 6,418,686 B1 * | 7/2002 | Record | ................... | E04C 2/288 52/284 |
| 6,622,442 B2 * | 9/2003 | Kwon | ................... | E01D 19/125 403/348 |
| 9,074,379 B2 * | 7/2015 | Ciuperca | ................... | E04G 9/10 |
| 9,151,046 B1 * | 10/2015 | Francavilla | ............... | E04B 2/84 |
| 2008/0209825 A1 * | 9/2008 | Smith | ...................... | E04D 7/00 52/169.14 |
| 2012/0192516 A1 * | 8/2012 | Hillers | ..................... | E04B 1/14 52/309.4 |
| 2013/0074433 A1 * | 3/2013 | Ciuperca | ................. | E04B 1/355 52/426 |
| 2014/0306088 A1 * | 10/2014 | Dryburgh | .............. | B28B 7/0014 249/13 |
| 2015/0013258 A1 * | 1/2015 | Sawatzky | ................. | E04B 2/46 52/309.1 |
| 2016/0069063 A1 * | 3/2016 | Harvey | .................... | E04B 2/10 52/125.2 |
| 2016/0069080 A1 * | 3/2016 | Palermo | ................. | E04C 2/421 52/223.6 |
| 2017/0284095 A1 * | 10/2017 | Collins | ................... | E04C 2/284 |

OTHER PUBLICATIONS

Chapter 6 of the International Residential Code (2015) 2015.
1999 SBCCI Standard for Hurricane Resistant Residential Construction, Chapter 3 1999.
"Buildings with Concrete or Masonry Exterior Walls", Standard for Residential Construction in High-Wind Regions. (2008) 2008.
Starting a Bitcoin Mining Business—A Complete Guide: https://www.profitableventure.com/starting-a-bitcoin-mining-business/ 2018.
Cloroben Spec Sheet #S00210 Feb. 2004.
"Tornado-Resistant Houses with Insulated Concrete Walls" by tornado Proof Houses / Disaster Proof Homes (https:/disastersafehome.com/walls.php 2018.
WFCM Wood Frame Construction Manual for One- and Two-Family Dwellings, American Wood Council (2015) https://www.awc.org/pdf/codes-standards/publications/wfcm/AWC-WFCM2015-ViewOnly-1510.pdf, cover page, pp. 11, 121-124, and 176-178 Apr. 2015.

* cited by examiner

REINFORCED CONCRETE BUILDING STRUCTURES AND METHODS FOR MAKING SAME

FIELD OF THE INVENTION

The inventions described herein relate to reinforced concrete structures and assemblies, building systems, and methods of fabrication.

BACKGROUND OF THE INVENTION

Concrete is a durable construction material. Reinforced concrete (often including rebar) is competitive with other durable building technologies, like steel frame or traditional bricks-and-mortar. But a building's strength and stability is also a function f how a building's framing works in conjunction with its foundation and other building elements to provide strength and stability for the structure. As recognized by FEMA, the Federal Emergency Management Agency ("Building Framing Systems and Best Practices," available at: https://www.fema.gov/media-library-data/20130726-1708-25045-9326/chapter7.pdf (2013)), properly designed and constructed building framing is important in all locations; however, particularly in coastal areas where wind, flood, and other loads can be extreme due to significant weather events, ensuring proper building framing is critical. Framing must adequately transfer all gravity, uplift, and lateral loads to the foundation.

In buildings (including residential structures), framing systems typically consist of the roof structure that supports the roof deck, exterior and interior load-bearing walls, beams, girders, posts, and floor framing, if any. Shear walls provide strength to resist lateral loads.

Exterior walls are one of the most important elements within the framing's load path from the roof to the foundation. Exterior walls must resist loads imposed on them (particularly by wind or seismic activity) and typically must function as assemblies to provide stability for the entire structure.

Three types of loads can be imposed on exterior walls: (1) loads that exist out of the plane of, or perpendicular to, the wall are imposed primarily from wind but can also result from seismic activity. All exterior walls are exposed to these out-of-plane forces; (2) vertical loads also called axial loads) are transferred into some walls from the roof (or upper-story walls) above. The vertical loads can be downward-acting gravity loads that result from the weight of the structure or upward-acting (uplift) loads from wind or seismic events. Uplift and gravity loads are considered in-plane loads since they occur within the plane of the wall, but act along the vertical axis of the wall. All load-bearing walls are exposed to in-plane gravity loads (such as the dead loads of non-load-bearing walls). In addition to the in-plane gravity loads, many walls are also exposed to uplift loads; and (3) in-plane horizontal loads can also exist in some walls, which typically result from wind forces imposed on building surfaces that are perpendicular to the walls. For example, wind loads acting on a building's roof and front wall create horizontal loads in its left and right walls. Those horizontal loads are collected through horizontal diaphragms such as floors and roof deck assemblies, and are called "shear loads." The walls that are needed to resist these loads are called "shear walls" or "shear panels." Shear walls that function as load-bearing walls are exposed to all three types of loading. Shear walls also provide lateral stability for a structure.

By way of background, Section 8602.10 of the International Residential Code (IRC) provides prescriptive construction details and requirements for braced wall panels for buildings exposed to 3-second gust basic wind speeds less than 110 mph (less than 100 mph in hurricane-prone areas). The Wood Frame Construction Manual (WFCM) provides prescriptive shear wall details for 3-second gust wind speeds from 85 mph to 150 mph. In addition, Section 305.4 of the SSTD-10 Standard for Hurricane Resistant Residential Construction provides shear wall designs appropriate for use in buildings exposed to wind speeds up to 110 mph (fastest mile). Shear walls may also be constructed with masonry, concrete, insulated concrete forms (ICFs) and with structural insulated panels (SIPs). SIPs consist of wood structural panels which sandwich a rigid insulation core, which is typically polystyrene or urethane.

When analyzing shear walls, two classifications of shear walls exist. Segmented shear walls are full-height, fully-sheathed wall segments that function independently to resist lateral loads. Perforated shear walls contain framed openings for windows and doors. Perforated shear walls rely upon continuous structural elements over windows and door openings to make the shear wall function as a single unit. Generally, greater lengths of perforated shear walls are needed to resist lateral loads than segmented shear walls. Also, in perforated shear walls, more attention in the detailing and design is needed above doors and windows, where framing functions as drag struts. The greater attention is needed to ensure that the drag struts and their connections are adequate to transfer in-plane loads through the shear wall.

The integrity of the overall building depends not only upon the strength of shear walls and other building components, but also on the adequacy of the connections that exist between them. Critical connections occur throughout the structure, but, in most houses, the most critical connections exist where the roof system connects to supporting walls; at openings (e.g., for windows and doors) and headers in the walls; where walls connect to each other at floor levels; and where walls connect to the foundation.

Shear walls (whether segmented or perforated) must be anchored to the foundation (or the shear wall below when on an elevated floor) to complete the continuous load path within this area of the building. A proper anchorage or connection prevents the shear walls and, in turn, the rest of the structure from laterally racking, displacing, or overturning during a high-wind or seismic event. The reactions (loads) at the ends of shear walls are proportional to wall height. Taller walls develop larger reactions and require stronger anchors, and anchorage requirements for even small homes can be thousands of pounds. With larger shear forces, shear forces at tie-downs become greater and adequate tie-down and anchorage become more difficult to achieve.

When wind forces act on a building, the building must transfer induced loads. This requires connections to transfer the loads into shear walls through both compression (pushing) and tension (pulling). It is important that all of the elements of the building work together in order to create the maximum amount of structural strength and allow the building to maintain its shape and not compromise the building envelope. A failure in the connection or v of the members could result in structural failure.

The use of walls constructed from reinforced concrete is becoming more prevalent in communities impacted by hurricanes. When properly designed and constructed, these styles of walls can perform well when exposed to high winds. Typically, concrete construction is used in conjunction with wood-framed roofs and, in the case of multi-story buildings, wood-framed floors. But typical concrete and masonry walls lack the thermal performance required by the IRC and often require framed walls or thick furring to allow the addition of sufficient insulation.

Insulated concrete form wall sections can achieve improved thermal and structural performance with a single, reinforced concrete-wall sections because its permanent insulating form remains in place. One construction technique uses pre-formed panels to form a pre-insulated wall system that relies upon concrete for its structural integrity. Requirements for insulated concrete form construction are provided in IRC Section R611. The prescriptive designs for ICF are well-developed and detailed. Examples of prescriptive designs for concrete and masonry walls in high-wind regions are contained in Section 205.5 of ICC 600. Prescriptive ICF designs that meet high-wind requirements of the IRC may be found in Section 209 of ICC 600. But these specifications only contemplate basic wind speeds of up to 150 mph. There remains a need for insulated concrete form walls and related structural elements that meet even higher high-wind requirements, at a minimum of 200 mph, to withstand stronger hurricane and tornado forces.

In addition to achieving stability in the face of significant wind loads, there is a need for building elements that also exhibit superior energy efficiency and fire resistance. They also must permit speedy and low-labor-cost construction projects, particularly by conventional build crews.

Walls can be fabricated several ways known to those of skill in the art including: (1) fluid (usually with ready-mixed concrete) placed into concrete forms usually with the aid of concrete pumps; and (2) prefabricated (precast), on-site or in a factory, generally in a flat position and lifted with a crane into final position on the house foundation. These wall panels can be made on the ground adjacent to the house, or they may be made in a factory and transported (e.g., by truck) to the work/building site.

One method of lowering overall construction cost is to prefabricate construction elements (such as walls) rather than manufacturing them on the construction site. Several prefabricated building construction techniques are known in the art. Prefabricated construction techniques may involve creating concrete building elements including foundations, walls, deck assemblies, and roof assemblies. The elements may be manufactured to contain interior and external finishes, windows, doors, and utility distribution systems. These elements may also be assembled on a construction site into structures such as homes, commercial and other office buildings, noise-reduction walls, military installations, etc.

Some prefabricated construction techniques involve constructing portions of a building at a manufacturing facility and shipping the portions to a construction site. One problem with such techniques is the need to create structures of sufficient light weight to enable cost-effective shipping. Many light-weight prefabricated structures lack sufficient load bearing capabilities for certain applications, including the significant wind events discussed above. A need exists for structures having high structural integrity, durability, and low shipping and assembly costs.

Cast-in-place concrete walls can be formed with steel, wood or insulating foam boards. The advantage of using ICFs is that the finished product accomplishes both a structural and energy conservation function simultaneously. Walls must be structurally designed conventionally reinforced concrete shear walls in accordance with practice outlined in the American Concrete Institute document Building Code Requirements 318 and the International Building Code (IBC).

Several methods of fabricating ICFs are known in the art. Typically, the wall has been prefabricated in a flat position with the insulation boards firmly attached, either next to the building and tilted up with a crane to a vertical position, or assembled in an offsite plant, transported to the site and erected with a crane. One major disadvantage to this fabrication method is the cost. Shipping, in particular, is expensive and time consuming. Another disadvantage is the use of polystyrene forms that result in exterior foam insulation, which may provide a route for insects and groundwater to enter the walls. Accordingly, there remains a need for structures that are designed to achieve the benefits of elements such as ICFs (e.g., energy efficiency, moisture resistance, pest resistance) without the significant cost, and the ability to withstand significant forces or penetration events.

SUMMARY OF THE INVENTION

The invention comprises, in one form thereof, insulated reinforced concrete wall, roof, and building structures and systems, including assemblies and methods of fabrication.

In one form, the invention comprises insulated concrete building structures that are rot, mold, insect, high-wind and fire resistant; resists moisture intrusion; exhibits high durability; controls thermal expansion and contraction; adjusts to structural movements; exhibits high energy-efficiency; and can be assembled using conventional construction crews. The structures may also be fabricated to achieve various aesthetic effects.

In another form, the invention comprises insulated precast concrete building structures that can withstand natural and man-made disasters, and are suitable for mission-critical environments such as hospitals, laboratories, data centers, assisted-living facilities, and military installations.

In another form, the invention comprises insulated precast concrete building structures that are suitable for noise-dampening applications, for example, buildings and facilities located in a noisy area, such as near an airport or highway. In one embodiment, the structures provide a sound reduction index of 52 dB compared with about 20-30 dB for lightweight cladding.

In another form, the invention comprises insulated precast concrete building structures that exhibit cost-effective fire-resistance, and in one embodiment, exhibits at least 4 hours' fire resistance.

In another embodiment, the invention comprises insulated precast concrete building structures suitable for fire separation/compartment walls.

In yet another form, the invention comprises insulated precast concrete building structures that exhibit high penetration resistance, and in one embodiment, are suitable for security walls in prisons, nuclear plants, and data centers. Penetration may occur from natural or man-made objects or forces, including vehicles, and weapons (e.g., missiles).

In another form, the invention comprises insulated precast concrete building structures that suitable for buildings requiring stabilized internal temperatures and protection.

In a further form, the invention comprises a method for fabricating and assembling precast concrete building structures in a safe and cost-efficient manner. Because much of the fabrication and assembly method contemplated herein occurs on ground-level, the need (and associated dangers associated with) vertical formwork and scaffolding are eliminated thereby reducing safety issues and reducing labor costs. The assembly methods may further be performed by conventional construction crews with the need for little additional training, thereby lowering labor costs. There is additional beneficial simplicity in the design, as labor only requires concrete flat work crew.

More particularly, the invention includes insulated reinforced concrete wall panels, each comprising an outer skin coating comprised of at least one of an acrylic resin, ceramic, and titanium, a concrete panel, a mesh mat, at least two fusion bars, each comprising a steel member at least 20" in length, wherein each fusion bar is disposed within the wall panel at a minimum of about 2' on center intervals, a rebar rod, a wall panel weld plate, a foam panel, an interior skin and interconnections for mating each insulated reinforced concrete wall panel to one another.

In another form, the invention includes a method for fabricating precast concrete building structures. The method comprises the steps of fabricating a form in the shape of a wall of desired dimensions on a flat surface; fabricating one or more insulated foam panels comprising a plurality of groove spaces in which fusion bars may be disposed; arranging the one or more foam panels inside the form; assembling, on top of the one or more foam panels, at least a wall panel weld plate, at least two fusion bars, each comprising a steel member at least 20" in length, wherein each fusion bar is disposed at a minimum of about 2' on center intervals, and a mesh mat; pumping, spraying, or pouring concrete into the form until it fills the form to substantially the top of the form; curing the concrete; removing the forms, elevating the cured concrete panel, and positioning a desired location; applying an interior skin comprising at, least, one of cement, fiberboard and sheetrock; and applying an outer skin comprised of at least one of an acrylic resin, ceramic, and titanium.

BRIEF DESCRIPTION OF THE DRAWINGS

The present invention is disclosed with reference to the accompanying drawings, wherein.

Corresponding reference characters indicate corresponding parts throughout the several views. The example set out herein illustrate several embodiments of the invention but should not be construed as limiting the scope of the invention in any manner.

DETAILED DESCRIPTION

Figure 1:
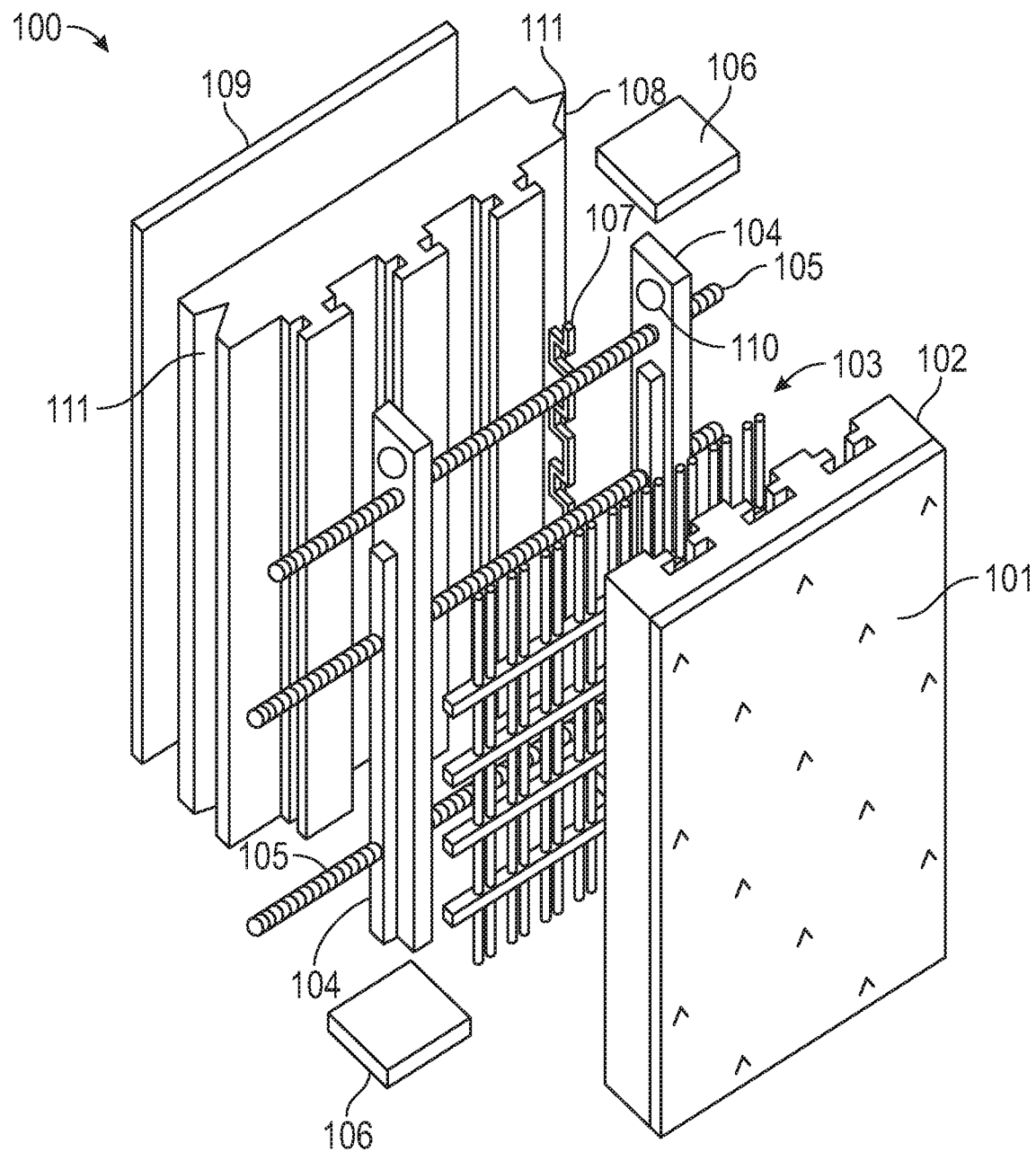
FIG. 1 is an exploded of a an reinforced concrete wall panel, according to one embodiment.

FIG. 1 shows one embodiment of an insulated, reinforced concrete wall panel or wall panel assembly. Insulated, reinforced concrete wall panel 100, shown in exploded form in FIG. 1, comprises an outer skin or external coating 101, concrete panel 102, welded rebar or wire mesh mat 103, fusion bars 104, optional rebar rods 105, wall panel weld plates 106, optional rebar chairs or stirrups 107, foam panel 108, and interior skin panel 109.

Outer skin or external coating 101 is any suitable coating for exterior, concrete vertical surfaces of a building or other structure. Outer skin or external coating 101 is applied to concrete panel 102. Outer skin or external coating 101 may be comprised of, for example, acrylic resins, ceramic, or titanium. Outer skin or external coating 101 may provide protection or decoration to the wall panel. Depending on the desired aesthetic or architectural detail, outer skin or external coating 101 may be, for example, textured or stamped, stained, or stenciled to resemble traditional architectural features such as brick or stonework. Outer skin or external coating 101 may further optionally provide water protection by incorporating hydrophobic elements; protection from the ingress of carbon dioxide and other aggressive gasses; resistance to chlorides and other waterborne salts; and UV light resistance. Outer skin or external coating 101 may be, for example, painted, rolled, or sprayed on the concrete panel and may be optionally built up to about 10 to 16 millimeters in thickness.

In one embodiment, external coating 101 is an acrylic architectural coating formulated with microscopic ceramic spheres. One example is marketed under the trade name EnviroCoat by EnviroBuilt Systems. EnviroCoat provides resistance to wind-driven rain and high permeability for moisture management along with exceptional endurance. EnviroCoat LT is a low-odor paint coating that provides significant resistance to cracking, peeling, chipping and oxidization. For industrial, commercial and residential applications to provide excellent weathering, gloss and color retention. EnviroCoat LT is mildew and algae resistant (on the paint film only) and provides excellent long-term elongation and flexibility. Outer skin or external coating 101 may be other thicknesses depending on desired architectural details.

Concrete panel 102 is a layer or layers of concrete. In one embodiment, concrete panel 102 comprises a concrete formulation marketed by by EnviroBuilt Systems. In one embodiment, the concrete panel 102 may be aerated. Concrete panel 102 is fabricated by, e.g., pumping, spraying, or pouring concrete into a form, as described below.

Welded rebar or wire mesh mat 103 is, in one embodiment, a prefabricated reinforcement consisting of a series of high strength, cold-drawn, or cold-rolled wires welded together in, for example, roughly square or rectangular grids. Each wire intersection may be electrically resistance-welded by a continuous automatic welder. Plain wires, deformed wires or a combination of both may be used. Welded rebar or wire mesh mat 103 comprising plain wires will bond to concrete by the positive mechanical anchorage at each welded wire intersection. Welded rebar or wire mesh mat 103 comprising deformed wire utilizes deformations plus welded intersections for bond and anchorage. Smaller diameter, closely-spaced wires may provide more uniform stress distribution and more effective crack control in wall panel 100. Welded rebar or wire mesh mat 103 may be formed in a wide range of wire sizes and spacings or patterns. Welded rebar or wire mesh mat 103 may be comprised of, e.g., basalt fiber or steel.

one embodiment, separate supports or spacing elements, furring elements or spacing furrs, as known in the art, may be attached to welded rebar or wire mesh mat 103 at several locations in order to position the mesh away from other elements of insulated, reinforced concrete wall panel 100, as may be desired. Using spacing elements in insulated, reinforced concrete wall panel 100 during the pumping of concrete in the concrete panel 102 forming process as discussed herein may be desired to ensure adequate spacing between elements to achieve sufficient encapsulation of such elements with concrete. Spacers may be of any appropriate shape and include, e.g., chairs or chair wheels made of steel, plastic, or non-corrosive material. In one example, spacers are attached to welded rebar or wire mesh mat 103 at, e.g., every 24" on center, or where needed, to, for example, create an approximately 2" distance between the surfaces where concrete can surround steel or fiber.

Welded rebar or wire mesh mat 103, in one embodiment, comprises one or more wire strings or rebar in, e.g., a 6"×6" grid pattern, or in other intervals in a woven or grid pattern of suitable size. Where the strings or rebar cross, spacers can be welded or clipped. Spacers provide attachment points for, e.g., fusion bars, rebar, or skin panels and also add dimensional spacing between the various elements in the panel and the concrete. For example, spacers may be 1/8" steel, or 3/8", 1/2", 3/4", etc. up to about 2½" and are attached at one or more of the intersection points of the strings or rebar by, e.g., welding, clipping, or tying with plastic or metal wire.

Welded rebar or wire mesh mat 103 is embedded in concrete panel 102, and may be further attached to fusion bars 104 and/or optional rebar rods 105 and/or rebar stirrups or chairs 107. In one embodiment, this may be accomplished with 6" to 8" threaded spacer bolts to secure the final sill plates for top of wall. Rebar or fiber may be connected by a system of ties, and connected to fusion bars through a system of call outs and pass-throughs/prefabricated holes.

In one example, welded rebar or wire mesh mat 103 may be comprised of ASTM A185 plain steel welded wire fabric. Wire spacing may be, e.g., 6"×6" or 4"×4", wire diameter may be W1.4/W1.4, W2.1/W2.1, or W4/W4, and sheet size 7'6"×20' or 7'×20'.

Fusion bars 104 serve in a structural capacity during lifting of insulated, reinforced concrete wall panel 100 (e.g., by a crane), particularly' if using a form of "tilt-up" method. They also provide dimensional control during assembly, and transfer lift resistance for the roof to improve a building's structural integrity. Fusion bars 104 can also assist in combating hydrostatic loads of liquid concrete during pour and setting.

According to one embodiment, fusion bar 104 comprises a steel member at least 20" in length. Fusion bars 104 optionally may be fabricated to a desired length depending, e.g., on wall height. In one example, fusion bar 104 is substantially rectangular, is up to about 2" thick, and exceeds the height of the concrete panel on the top end by between about 4" and 6", and/or exceeds the height of wall panel 100 down into the footer, and is attached there by welding to wall panel weld plates 106 or j-bolts.

In one embodiment, fusion bar 104 comprises a steel member that is 10'6" in length/height, substantially rectangular, and 3/8" gauge thickness. In this example, fusion bar 104's length exceeds the length/height of the remaining elements of insulated, reinforced concrete wall panel 100 by 6", such that a crane may be connected to one end (through prefabricated hole or pass through 110) to lift the wall panel. Other heights/lengths and thicknesses may be readily apparent to one of ordinary skill (e.g., the gauge of the fusion bar may be any suitable gauge including up to about 2").

Fusion bar 104 terminates at the bottom of insulated, reinforced concrete wall panel 100 and is connected to wall panel weld plate 106. In one embodiment, fusion bar 104 is welded to wall panel weld plate 106, which is then connected to a footer, or a weld plate disposed on a footer. In another embodiment, fusion bar 104 is tacked and then welded to wall panel weld plate 106.

Figure 2:
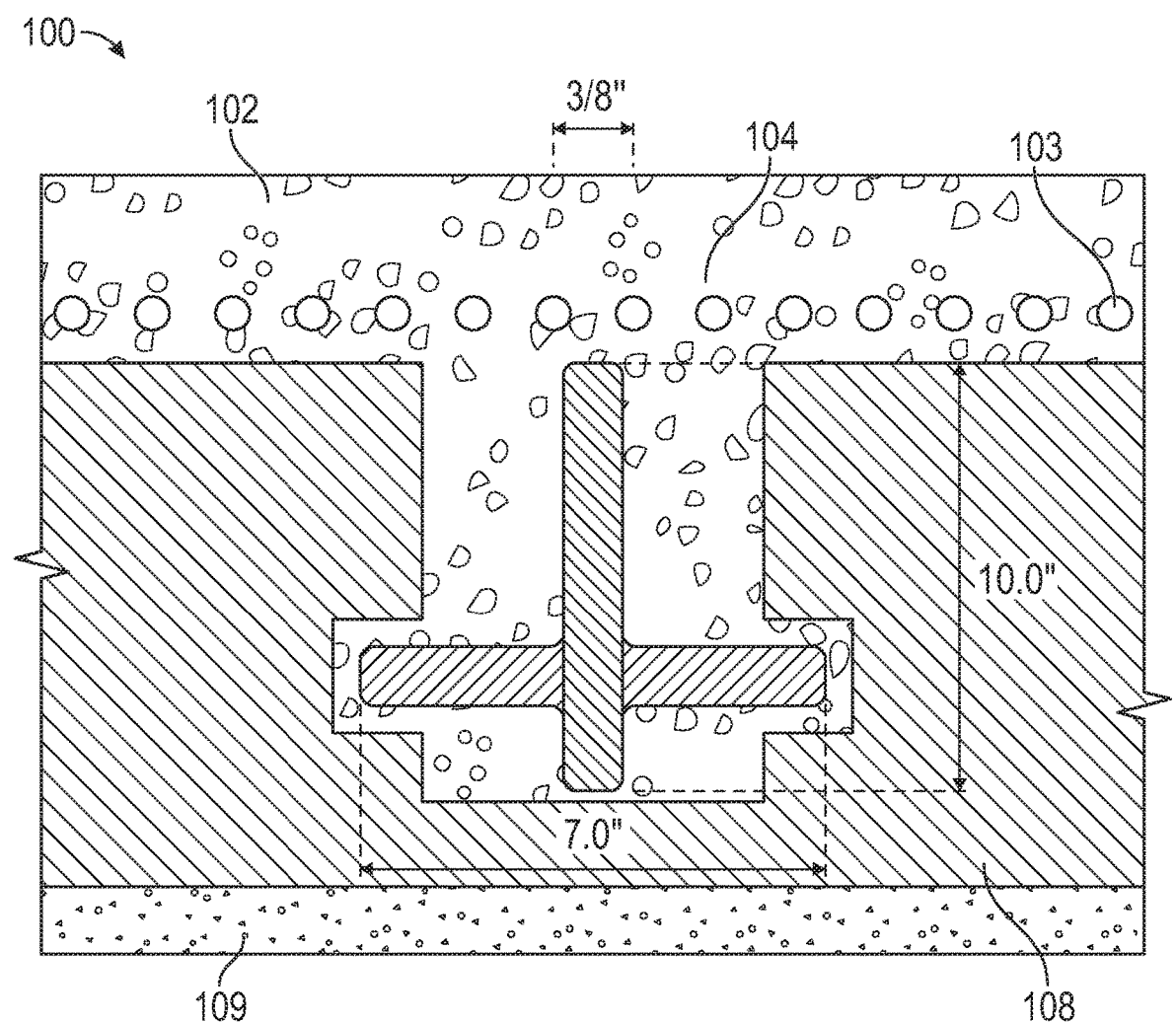
FIG. 2 is a cross-sectional, edge-on view of a portion of an insulated, reinforced concrete wall panel according to one embodiment that illustrates a "t" shaped fusion bar and exemplary dimensions.

In yet another embodiment, fusion bar 104 comprises one or more steel members fashioned in a "t" or "+" or "x" shape when viewed on-edge (as shown in FIGS. 1-2). In one example where fusion bar 104 comprises steel members fashioned a "t" shape, the width of fusion bar 104 is about 10.0" wide at its widest point in the direction perpendicular to that of the width of foam panel 108 (as shown in FIG. 2), and 3/8" thick. In the direction parallel to that of the width of foam panel 108, fusion bar 104 is about 7.0" wide at its widest point, as shown.

Figure 3A:
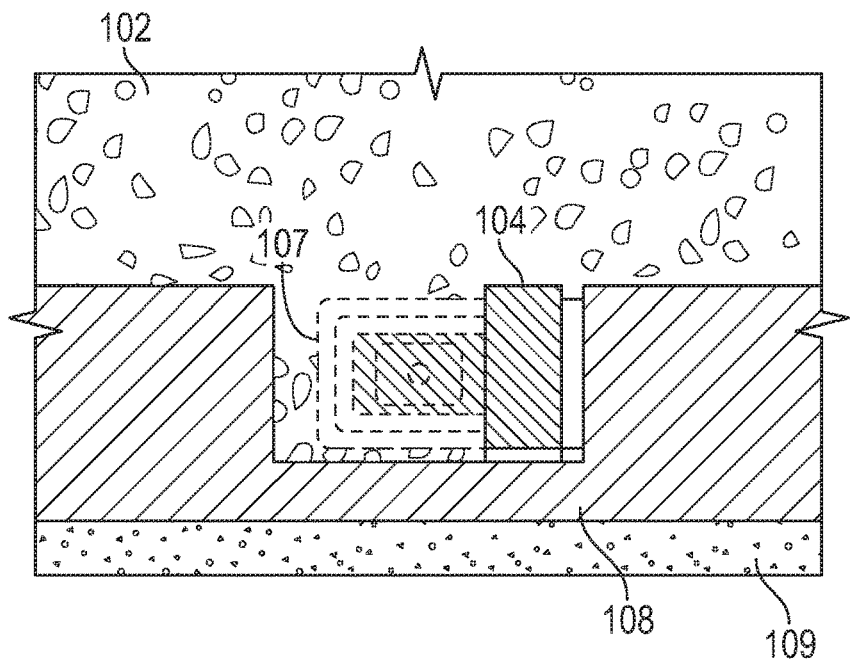
FIG. 3A is a cross-sectional, edge-on view of a portion of an insulated, reinforced concrete wall panel according to one embodiment that illustrates a rectangular-shaped fusion bar positioned within a void in the foam panel by a rebar column.
Figure 3B:
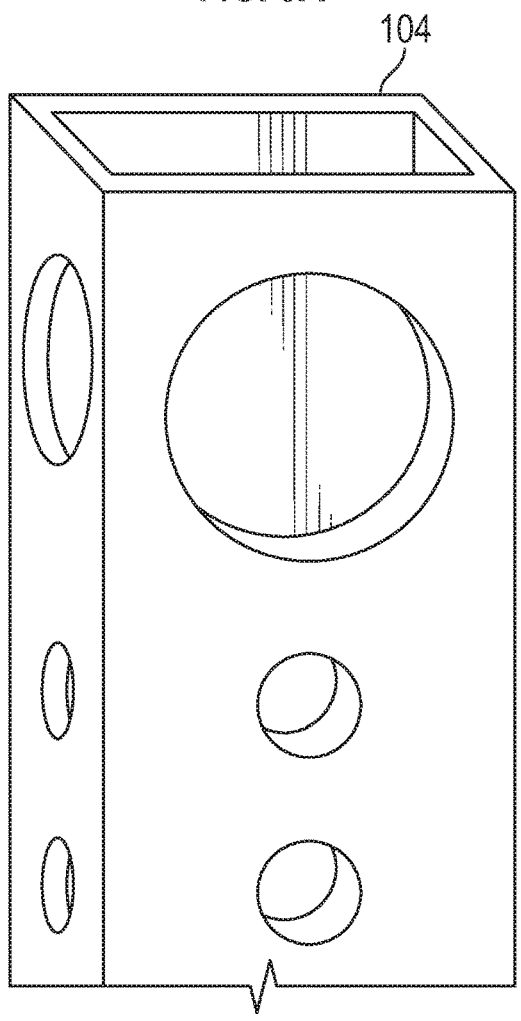
FIG. 3B is an orthogonal view of a portion of a fusion bar according to one embodiment.

In one embodiment, holes 110 are prefabricated in the fusion bar 104 at certain intervals, such as six inches below the top of the fusion bar 104, and sixteen inches above the bottom of insulated, reinforced concrete wall panel 100, or, alternatively, every four inches along the complete height of the fusion bar 104, as illustrated in FIG. 3B. The holes may be varied in size. In one example, hole size is 0.5-2" in diameter. In another embodiment, the hole sizes disposed in one fusion bar 104 may vary in size. For example, a hole 110 six inches below the top of the fusion bar 104 may be 2" in diameter in to facilitate attachment to a crane for lifting, and a hole disposed sixteen inches from the base of fusion bar 104 may be 1" in diameter in order to facilitate the passage of a rebar through the hole.

In one embodiment, as shown in FIG. 1, the dimensions, quantity, and hole pattern allow for the passing of a plurality of rebar rods 105 through the holes in the fusion bar 104 in a horizontal direction at desired intervals, such that the rebar rods 105 create a ladder pattern from the top to bottom of insulated, reinforced concrete wall panel 100. In another embodiment, as shown in FIG. 3B, fusion bar 104 may be hollow rather than solid, to allow for concrete to surround its surfaces.

Fusion bar 104 may have other dimensions and shapes (e.g., rectangular, as shown in FIG. 3A), and be formed from other types of metal, such as aluminum, titanium, plastic, and other suitable materials that can withstand the lift requirements of the panel, or fiber equivalents.

Figure 4A:
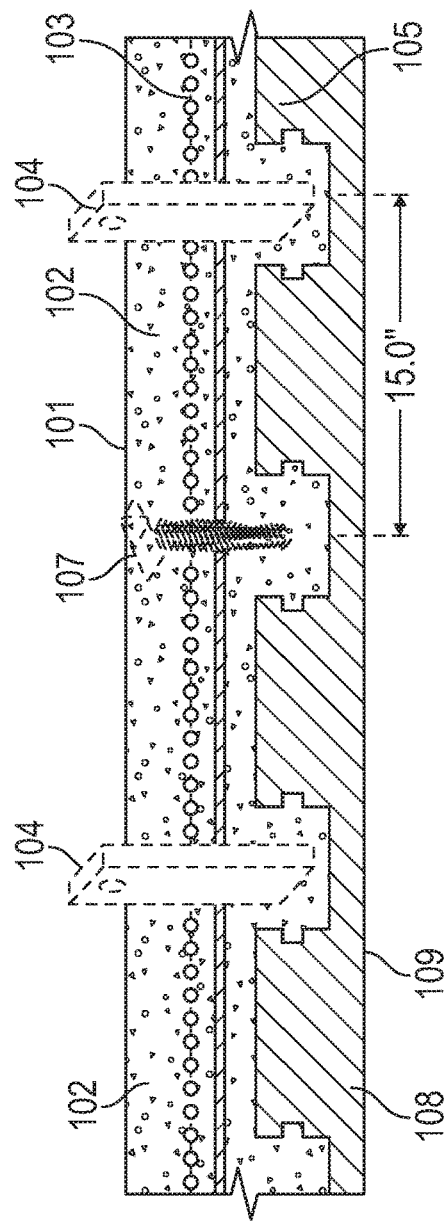
FIG. 4A is a cross-sectional, edge-on view of a portion of an insulated, reinforced concrete wall panel according to one embodiment that illustrates embedded fusion bars having threaded rebar, alternating with a rebar chair column.
Figure 4B:
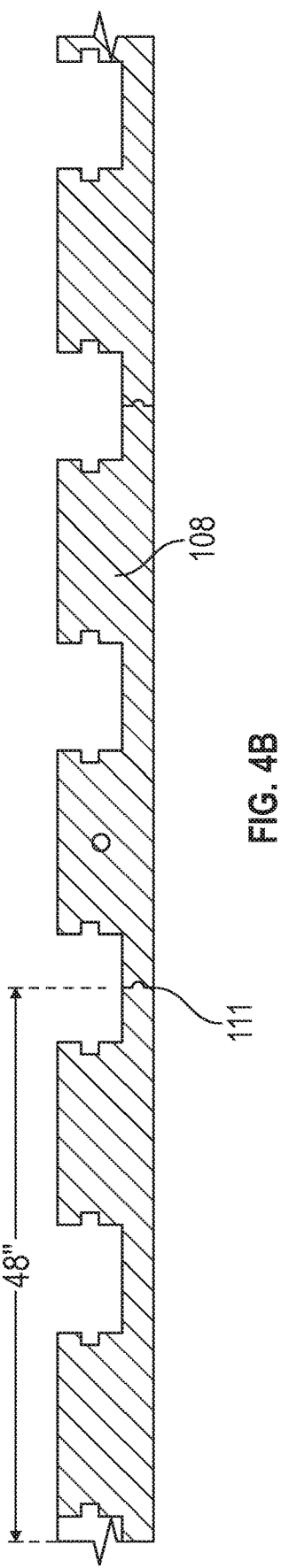
FIG. 4B is a cross-sectional, edge-on view of a portion of a foam panel and exemplary dimensions.

In one embodiment, a plurality of fusion bars 104 are positioned within the wall panel at about 2 foot-on-center intervals (when measured horizontally) such that the void between fusion bars is a maximum of about 15 inches, as shown in FIGS. 4A and 4B. Positioning each fusion bar 104 such that there is only about a 15" void between bars is particularly useful in settings where resistance to penetration by natural or man-made objects is desired. (As will be readily apparent to one of ordinary skill, FIG. 4A illustrates fusion bars 104 and rebar chairs or stirrups 107, described herein, facing not edge-on, but rather, in a stylized fashion as configured in FIG. 1 to roughly indicate the location of the bars and columns within the larger assembly. Of course, the appropriate edge-on configuration of the fusion bar, if viewed from the angle depicted in FIG. 4A would resemble the cross-section cut shown in FIGS. 2 and 3A, as appropriate.) The weakest part of any panel is the open area where only a skin protects the panel. Any opening in the wall panel 100 of more than 24" without steel or rebar, for example, creates a point of possible penetration by a weapon. However, when confronted with such a weapon, the panel of the invention would have one or perhaps two fusion bars at about 15" apart, resulting in significant resistance.

As shown in FIG. 4A, fusion bars 104 can be placed at alternate intervals depending on the anticipated transportation and concrete stresses. Rebar rods may be positioned in a vertical direction parallel to fusion bars 104. In such an embodiment, a plurality of rebar rods may alternate with the fusion bars 104 in voids in foam panel 108. In yet another embodiment, rebar stirrups or chairs 107 are arranged in a column in a vertical direction parallel to fusion bars 104, as illustrated in FIG. 3A. In that embodiment, a column of rebar stirrups or chairs 107 may alternate with each fusion bar 104. In another embodiment, the column of rebar stirrups or chairs 107 is combined with a vertically-oriented rebar rods 105, together, alternating with each fusion bar 104.

As shown in FIG. 4A, in one embodiment, one or more rebar rods 105 is run in a horizontal direction for substantially the full length of the insulated, reinforced concrete wall panel 100 panel, through holes in one or more fusion bars 104. Rebar rods 105 provides additional rigidity to insulated, reinforced concrete wall panel 100 during transportation, construction of building shell, and pouring of concrete. According to one embodiment, the rebar is ⅜" gauge. The rebar may be fashioned in other gauges, such as ¼", ½", ¾", ⅝", ⅔", ⅞", 1 inch, etc. In one embodiment shown in FIG. 3A, rebar chairs or stirrups 107 are employed to position fusion bars 104 straight/vertical, and correctly spaced apart from other elements before the concrete is poured. The rebar chairs or stirrups may be made out of #3 to #14 bar, or alternatively other options for keeping the fusion bars straight or attaching fusion bars 104 to other structural elements, such as welding, may be used. In another embodiment, each wall panel is further reinforced with a "cross" rebar, which is run diagonally from one corner to the other, which may be tied to the horizontal rebar 105.

In another embodiment, rebar rods 105 is connected to a plurality of spacers or rebar chairs in contact with foam panel 108. The plurality of spacers or rebar chairs in contact with foam panel 108 are operable to maintain space between rebar rods 105 and foam panel 108 such that concrete is able to adequately encapsulate rebar rods 105 and the other insulated, reinforced concrete wall panel 100 elements.

Rebar stirrups 107 may be made from high-strength steel wire. Rebar stirrups 107 may be bent using a machine into a supportive cage that runs the length of a concrete panel "column," as shown in FIG. 3A. Rebar stirrups 107 may made out of #3 or #4 bar, or alternatively #3 through #9 bar.

Additionally, an actual steel column can be inserted in column form design. The form itself can range from 6" to 72".

Wall panel weld plates 106 are used to attach insulated, reinforced concrete wall panel 100 to footers, or to other weld plates located on footers, or to weld plates 106 that attach to wall panel elements, deck assembly elements, roof assembly elements, etc. Wall panel weld plate 106 may be comprised of ⅜" to ½" steel.

Foam panel 108 may be comprised of extruded polystyrene (XPS) or expanded polystyrene (EPS), or other material known in the art, including forms are manufactured from any of the following materials: polyurethane foam (including soy-based foam), cement-bonded wood fiber, cement-bonded polystyrene beads, cellular concrete and thastyron. Foam panel 108 may be treated with insecticides or waterproofing materials. Each panel may have on each end thereof an interconnection means, such as a tongue and a groove, for interconnecting with a similar form. Interconnections may further be set using glue or tape.

Foam panel 108 may be custom fabricated in varying thickness, size, height, and width depending on the project needs. In one example, foam panel 108 may be fabricated with the dimensions noted in FIG. 4B.

Foam panel 108 may be formed for direct placement of fusion bars. As shown in FIGS. 1 and 2, foam panel 108 is designed with grooves or voids that will result, in the final insulated, reinforced concrete wall panel 100, in concrete "columns." Fusion bar 104, rebar rods 105, stirrups, etc. may be disposed within the void spaces in form panel 108 that will later be filled with concrete. In one embodiment, the void in foam panel 108 further includes groves fabricated to accept portions of fusion bar 104. For example, for a "t" shaped fusion bar 104, foam panel 108 is formed with a void shaped for receiving the cross-hatch portion of the "t".

Turning back to FIG. 1, interior skin 109 is a surface that may be made of cement fiberboard or sheetrock or other material suitable for interior walls, including wood, plastic, or metal. Skin 109 is attached to foam panel 108 by, e.g., industrial glue without petroleum as the filler chemical, or other suitable means, such as Tap-cons, red heads, or any flat-headed fastening for concrete material.

Method of Wall Fabrication and Structure Assembly

Figure 8:
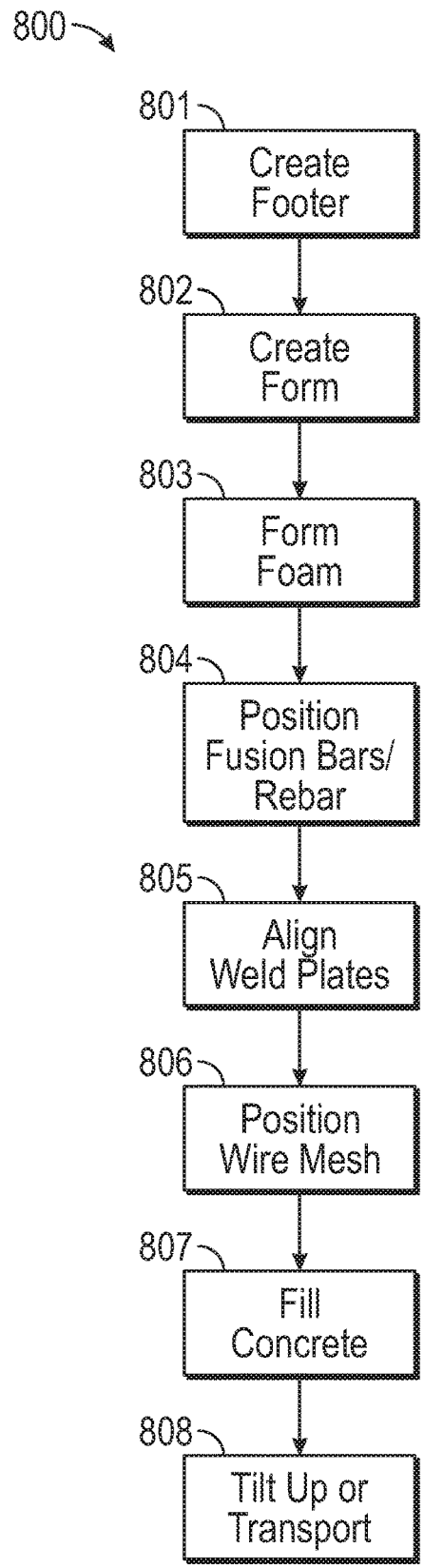
FIG. 8 is a flow diagram illustrating steps for fabricating a an insulated, reinforced concrete wall panel according to an embodiment.

Turning to FIG. 8, a flow diagram illustrating steps 800 for fabricating an example of insulated, reinforced concrete well panel 100 is shown. In one embodiment, insulated, reinforced concrete wall panel 100 is fabricated by, in step 801, fabricating a footer to which the wall panel will be attached, and then creating in step 802 a form in the shape of a wall of desired dimensions (e.g., rectangular) on a flat surface (e.g., a building foundation or floor). The form may be made of wood, plastic, or other suitable material as known to those of skill in the art.

One or more foam panels 108 are fabricated in step 803 according to the desired specifications e.g., material type, thickness), groove depth and disposition, etc., and, if needed, interlocked using foam panel 108 interlocking means 111 (shown in FIG. 1) on, for example, the bottom or lowermost layer inside the form. One or more elements of insulated, reinforced concrete wall panel 100 including, for example, a plurality of fusion bars 104, rebar rods 105, wall panel weld plate 106, then welded rebar or wire mesh mat 103 are assembled in steps 804-806 on top of the foam panel 108.

In one embodiment, a plurality of fusion bars 104 are arranged on top of the one or more foam panels 108. In another embodiment, a plurality of fusion bars 104 shaped in a "t" shape, are inserted into grooves created in foam panels 108 as shown in FIG. 2. Spacers or rebar chairs or columns may be employed to position fusion bars 104 like that shown in FIG. 3A.

Concrete is then pumped in the form in step 807 so that concrete covers over the insulated, reinforced concrete wall panel 100 elements (assembled flat). Concrete continues to be added to the form to reach a selected or desired height or the top of a form, and then the assembly may be vibrated, and left to cure. In one embodiment, concrete is poured to a level approximately 2" above the height of the tallest peak of the foam panel 108. An assortment of architectural elements such as cornices, bullnoses and reveals can be optionally cast into the concrete.

The resulting insulated, reinforced concrete wall panel 100, when cured and the form removed, comprises the bottom foam panel 108 or skin panel 109 interior face, which is on the bottom of the form, and concrete exterior face comprising within it the concrete panel 102 and one or more reinforcing mechanisms (e.g., welded rebar or wire mesh mat 103, plurality of fusion bars 104, rebar rods 105, and/or rebar chairs or stirrups 107) embedded in the concrete, as shown in FIGS. 1 and 2. These elements are encapsulated in concrete and provide reinforcement for the insulated, reinforced concrete wall panel 100.

The insulated, reinforced concrete wall panel 100 may then be elevated into place in step 808 via a crane or other hoisting or tilt-up techniques. Cranes may connect to connection points or holes in fusion bars 104 (which may extend past the remainder of the insulated, reinforced concrete wall panel 100 in order to facilitate lifting by cranes or hoisting mechanisms) in order to raise the walls and position them on a footer, where they are braced and welded together.

Alternatively, the wall panel 100 may be fabricated by poured-in-place techniques. These may comprise erecting one or more elements of insulated, reinforced concrete wall panel 100 (e.g., welded rebar or wire mesh mat 103, plurality of fusion bars 104, rebar rods 105, wall panel weld plate 106, rebar chairs or stirrups 107, foam panel 108, etc.), setting removable forms, pouring concrete in the forms, then removing the forms to leave a concrete wall comprising the foam panel 108 or skin panel 109 interior face, and concrete core exterior face comprising within the concrete layer one or more reinforcing mechanisms.

The concrete may be pumped, poured or sprayed by techniques known to those of skill in the art. The concrete may achieve a thickness at its thickest point of 6"-24". Preferably, concrete is pumped into forms to ensure consistency and coverage of the steel inside.

Insulated, reinforced concrete wall panel 100 may also alternatively be prefabricated in a manufacturing facility along with corresponding foundation assemblies, deck assemblies, and roof assemblies, and transported to a construction site for assembly. In one example, manufacture of the wall panels occurs at a fixed facility that allows for the use of heated forms to speed curing of the concrete and to better control the texture, color, and quality of the finished product.

Panels joined together to create a multiple-panel insulated, reinforced concrete wall panel 100 can be fashioned in multiple heights, lengths, and widths. For example, an insulated, reinforced concrete wall panel 100 panels may be 10' in height and 32' long. Horizontal panel lengths may be provided at 4', 8', 12',16', 24',32', 48', etc. Vertical panel heights may be provided at 8',10', 12', and up. If panels are prefabricated, the horizontal and vertical lengths may be determined by maximum shipping size and weight.

Figure 5A:
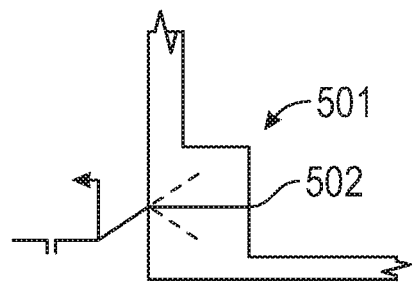
FIG. 5A is a representation of an in ion between a corner panel and a wall panel according to one embodiment.
Figure 5B:
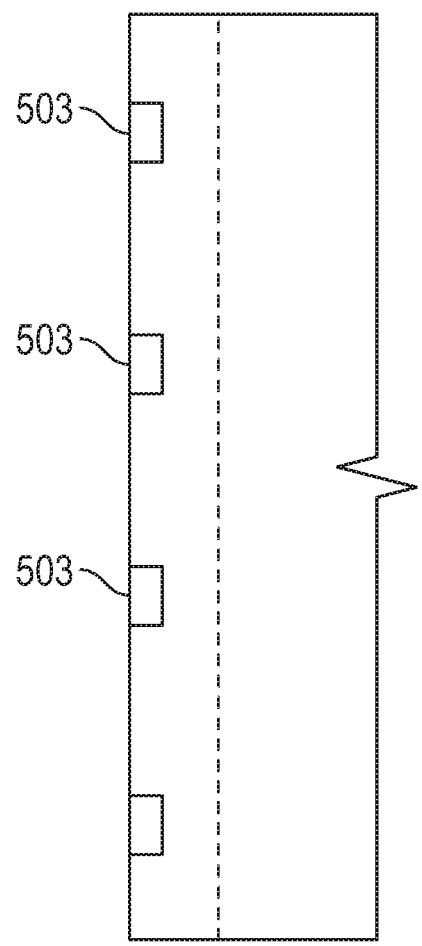
FIG. 5B is a representation of the positions of weld plates connected to an insulated, reinforced concrete wall panel according to one embodiment.

Wall assemblies 100 feature interconnecting means, and in one example shown in FIG. 5A, comprise diagonal end configurations 501, such that they mate to each other to form a longer wall or a corner, and may be secured by glue or other suitable means. FIG. 5A illustrates such an interconnection 502 between a corner panel and a wall panel, showing the meeting of weld plates. Insulated, reinforced concrete wall panel 100 may further comprise threaded bolt holes for receiving bolts to achieve interconnection. FIG. 5B illustrates weld plates disposed on a wall section for interconnection to other structural elements. As shown, four weld plates are used every 10 feet of wall section.

Insulated, reinforced concrete wall panel 100 thickness can be adjusted by selectively changing the width(s) of fusion bar 104, concrete panel 102, or foam panel 108. This provides for thicker walls, deck assemblies, and foundations for concrete pours, if desired, for particular applications. In one embodiment, a panel of insulated, reinforced concrete wall panel 100 is 12" thick, 10' in height, and 48" in horizontal width, and comprises foam panel 108, which ranges from 2" at its thinnest point to 6" at its thickest point.

Insulated, reinforced concrete wall panel 100 is attached to a footer. In one example, a concrete footing is pumped or poured below grade in an excavation, a concrete foundation wall is fabricated on top of it, and steel plates and steel angles are set into the wall panel at points where wall other panel assemblies will be attached. After the concrete is cured, the foundation is backfilled. The wall panels are set in place on the foundation wall, and welded to it via wall panel weld plate 106. Footers may be positioned, for example, at intervals of 2' on center. Footers may further include a steel 8"×12" weld plate.

Door and Window Assemblies

Figure 6:
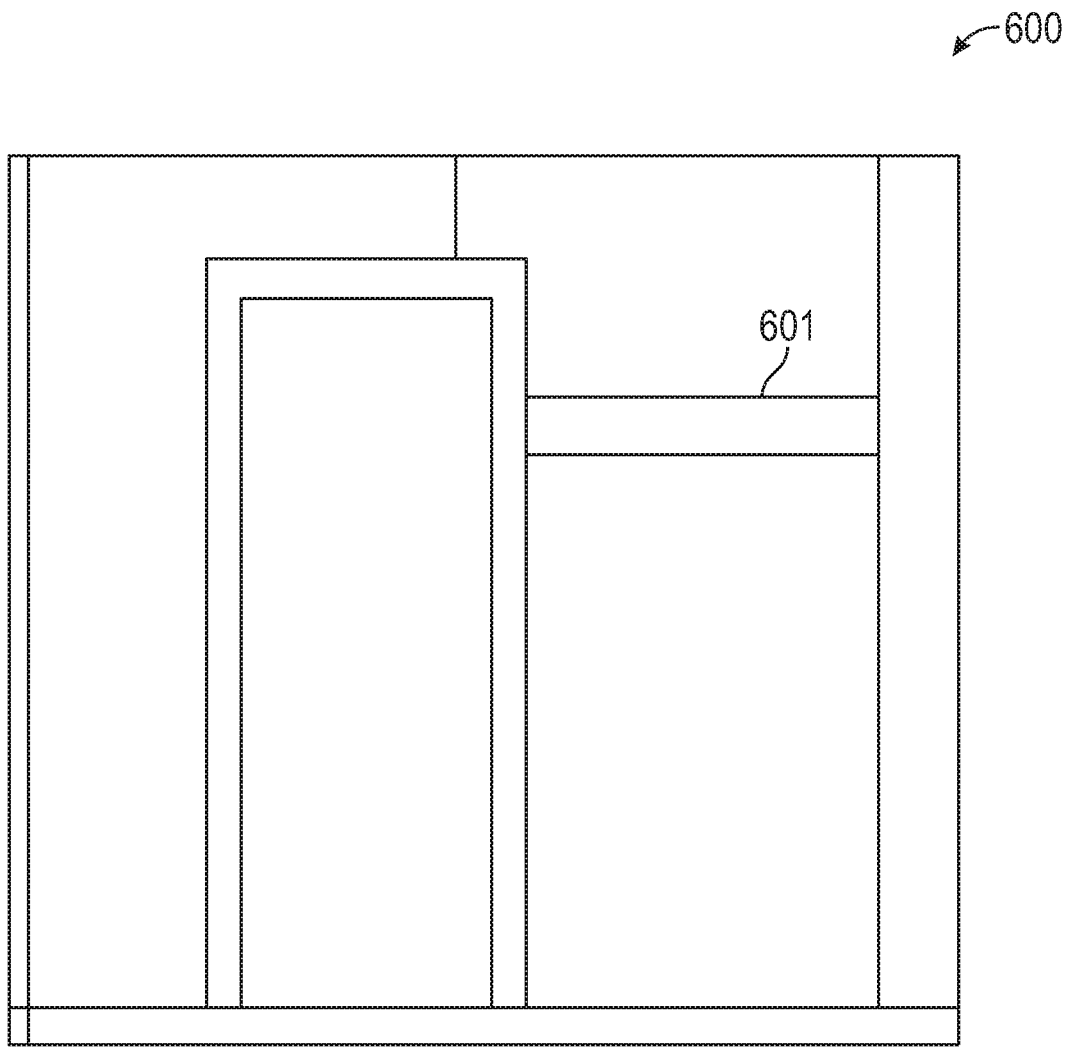
FIG. 6 is a diagram view of a door assembly, according to one embodiment.
Figure 7A:
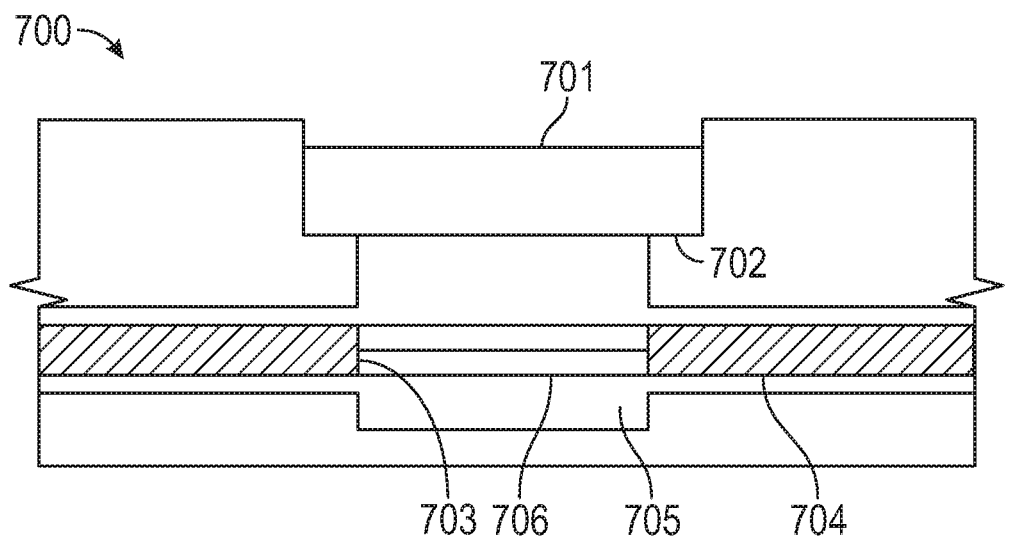
FIG. 7A is a cross-sectional, edge-on view of a portion of a window assembly according to one embodiment
Figure 7B:
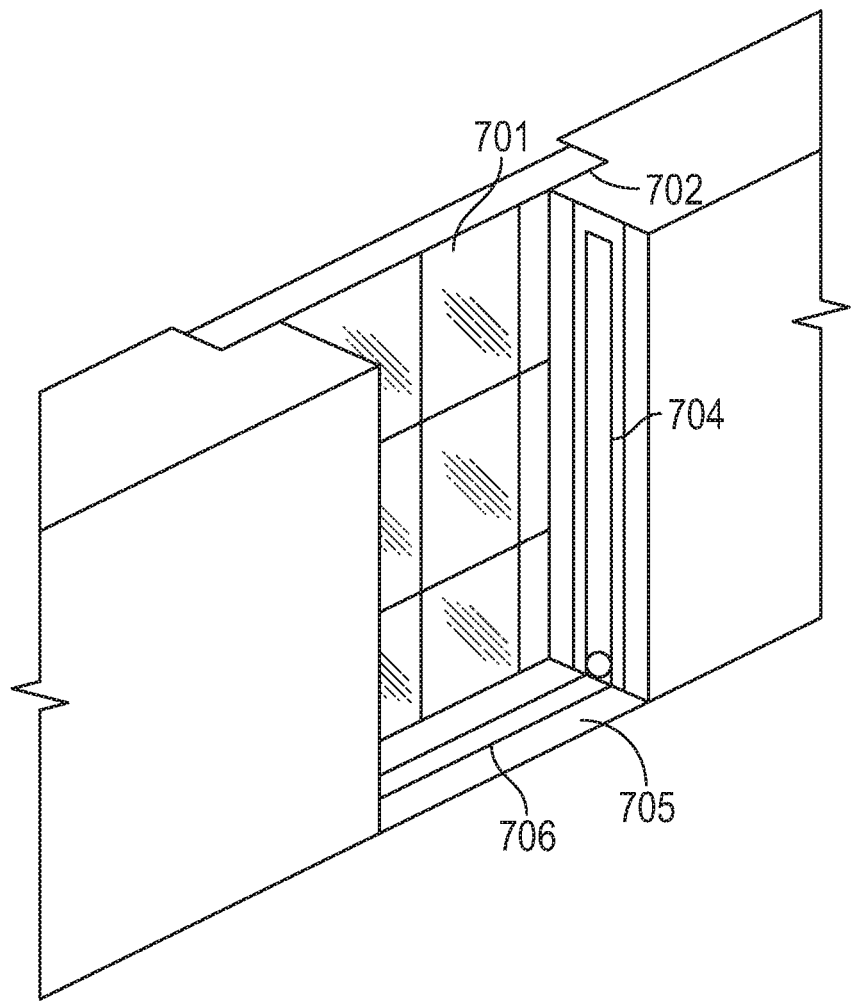
FIG. 7B is an orthogonal view of a portion of a window assembly for storage of storm shutters, according to one embodiment.

Wall assemblies 100 can include doors and windows. In one embodiment, shown in FIGS. 6, 7A, and 7B, window and door frames operate to match the configuration of the insulated, reinforced concrete wall panel 100 forms.

Where windows and doors are positioned, portions of insulated, reinforced concrete wall panel 100 elements are removed and/or forms/concrete stops are created to fabricate the perforations into the concrete. Perforated wall panel 600 having a door frame is shown in FIG. 6. As shown in FIG. 7A, a portion 700 of a wall panel having a window 701 disposed against concrete stop 702 is shown.

Perforations for windows and/or doors may include stops, lips, or edges for attachment to steel or wood frames, attached from the exterior. For example, a steel frame for window 701, which may be 3'×6' is to concrete stop 702 by caulking and concrete screws, such as 1¾" Tap-con screws. Three holes may be created through the steel frame on each side, and two holes on the top and bottom, to accommodate the screws. Window 701 is inset and attached to the overall structure from the "outside-in" so that pressure from the outside of the structure results in a blind stop for the otherwise relatively weaker window (at least when compared to the remainder of the wall panel).

Frames may also be installed and clipped, bolted, or welded to fusion bars 104 to prevent poured concrete from impinging on the windows or doors. In one embodiment, the final thickness of panel will determine the thickness of the fill in void template. Any shape, size or configuration of the opening call-out will be filled with foam in the shape or form required. That form will be surrounded by rebar #5 or greater. On final cure the form will be removed to reveal the shape of the door or window, which may include a concrete blind stop (e.g., 702) required for wind-pressure resistance.

Doors may be fabricated by, for example, including in the insulated, reinforced concrete wall panel 100 assembly 2'×8' pressure-treated wood to form perforation, and the wood is cast into the concrete. Doors may be attached by inserting 10-12" concrete bolts every 12" in a frame. Threads may be precast into wall call-outs to secure frame to concrete and therefore have a base connection for windows or doors. The bolts may be thereafter further secured by pouring concrete over them. Alternatively, if pressure-treated wood is not desirable, the frame may be secured directly by screwing into the concrete.

Grooves or voids may be included in insulated, reinforced concrete wall panel 100 for storage of storm shutters 704 or other protective materials, which may be rolled into position using rollers, ball bearings, wheels, or other suitable means along, for example, a track 706 disposed on sill 705, as shown in FIG. 7A.

In the embodiment illustrated, storm shutters 704 are 18" wide, made of concrete or other suitable material, and stored and deployed in a "pocket door" fashion, where they are located within a void in the wall, pulled along a track from either end of window 701, and connected in the middle. Other examples of storm shutter storage and deployment may be readily available, including movement along tracks, ball bearings, wheels, a system of ropes and pulleys, etc.

Wall assemblies 100 may further include embeds or inserts for utilities or plumbing (as shown in FIG. 6 at 601), which are inserted prior to the concrete placement, as described below. These embeds 601 may be conduits through which wires or other materials may be run through the wall panel, made of, for example, PVC or other suitable material and disposed within the wall panel at locations that are flexible to code.

Connections

Between the footers, the insulated, reinforced concrete wall panel 100 is an integrated welding system. The system comprises wall panel weld plate 106, which may be 8"×10" (for overhang, a ½" minimum weld plate may be married to the same sized plate at the base of a wall by welding.

Wall assemblies 100 can attach to other building element assemblies, including roof assemblies, deck assemblies, and other structures. Wall sections, for example, may be made up of five or more wall panels. Each wall section may have continuous wire mesh 103 and continuous rebar 105 threaded through them.

Roof Assembly

Figure 9:
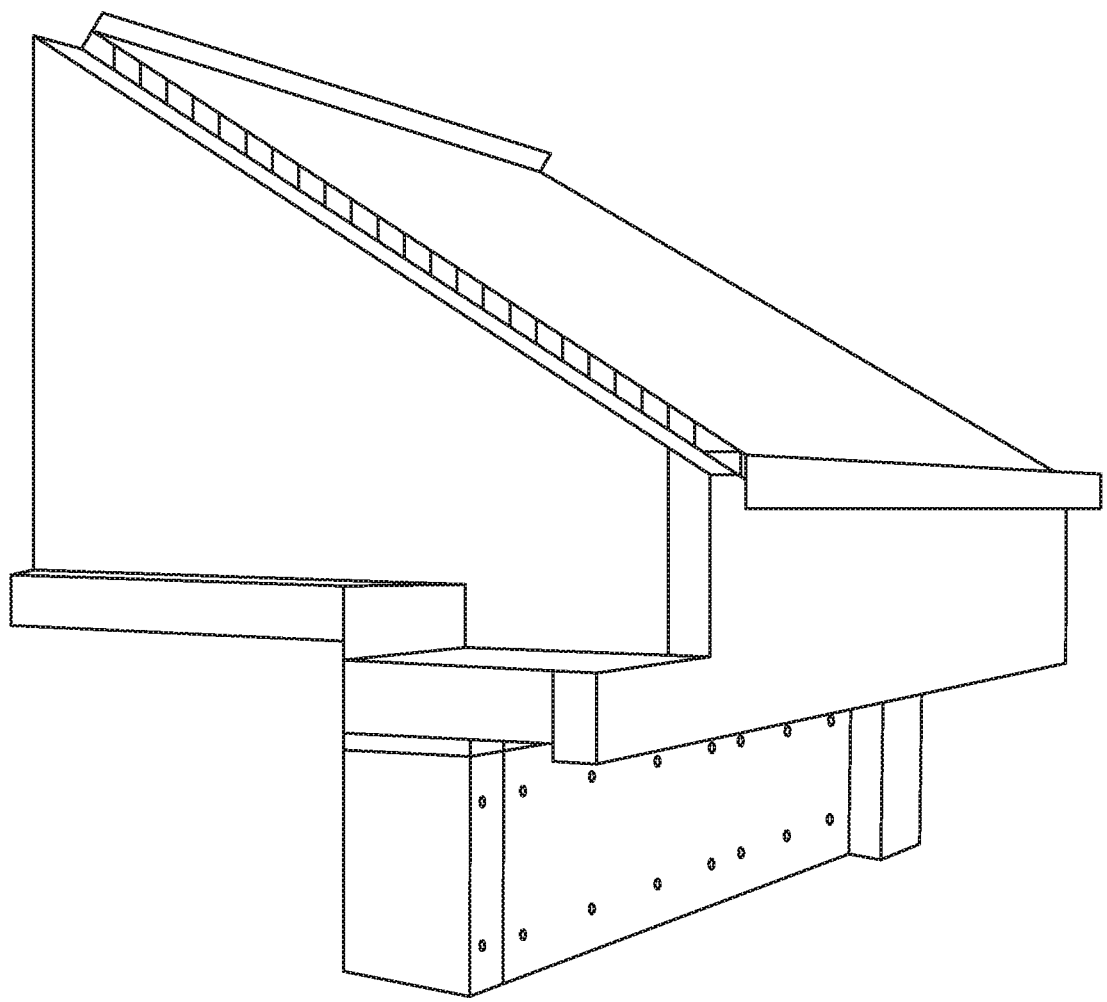
FIG. 9 is a view of a roof assembly according to an embodiment.

In one embodiment shown in FIG. 9, a roof assembly according to the invention is shown. Roof segments can be fashioned from the same system and method as insulated, reinforced concrete wall panel 100. In one embodiment, the roof assembly comprises the components of insulated, reinforced concrete wall panel 100 except for skin panel 109. Fusion bars 104 of roof assemblies are connected to fusion bars of wall assemblies 100 through roof mounts. In some embodiments, it may be desirable to connect insulated, reinforced concrete wall panel 100 to a portion of roof assembly in between fusion bar 104 of roof assembly. Where this occurs, it is possible to connect insulated, reinforced concrete wall panel 100 to roof assembly using metal plate, for example, having ⅜" to 2" steel flat weld plates on concrete gable, where there is an 8' connection on center. Metal plate may contain at least one threaded hole therein for bolting to insulated, reinforced concrete wall panel 100.

Where two roof assemblies meet at the apex of a roofline, connections will follow the same dimensions and fastening as the wall-to-wall connections.

With the design herein, roofs can be placed, bolted or welded, and finished in a matter of hours. The panels are installed in complete lengths that span from the roof apex or roof peak to the exterior walls and overhang. In one embodiment, overhang support is bolted to fusion bar 104 of insulated, reinforced concrete wall panel and attached to the edge of the roof assembly.

Roof assembly can include architectural roof finishes common to the housing industry. For example, exterior skin panels can comprise rubber finishes such as Thermoplastic Polyolefin (TPO), Ethylene Propylene Diene Monomer (EPDM) or Polyvinyl Chloride (PVC) membranes. Or the skin panels can be fashioned with other components known in the industry such as shingles, tiles, slate, metal, fiber cement, siding, or asphalt.

Roof assembly panels can be fabricated on-site and lifted into place using a crane, or in the widest panel sizes consistent with shipping restraints for manufacture elsewhere. Roof panels may be designed to be installed with several slopes, such as 12/12, 9/12, 6/12, 3/12, 2/12, or other slopes. In severe weather areas such as those with heavy snow seasons, roof assembly can be fashioned with heavier gauge components such as heavier rebar rods 105. Roof assemblies may further include expandable foam for additional insulation in high ceiling situations. Where applications call for increased structural integrity, such as in areas prone to hurricanes or tornados, concrete can be used within roof assembly panels as an inclined beam.

Roof assembly panels can accommodate several structural and architectural features, such as dormers, chimneys, exhaust vents, ridge vents, and gutters.

In another embodiment, the roof assembly may comprise a stone coated metal system. The end of fusion bars 104 may be welded to the roof assembly using weld plates. Roof attachments designed to withstand 200 MPH winds may consist of a 4'×2' panel with 12 connection screw holes, where each hole is fasted to roof decking with two, 2" screws cross-fastened.

Multistory Structures

Figure 10:
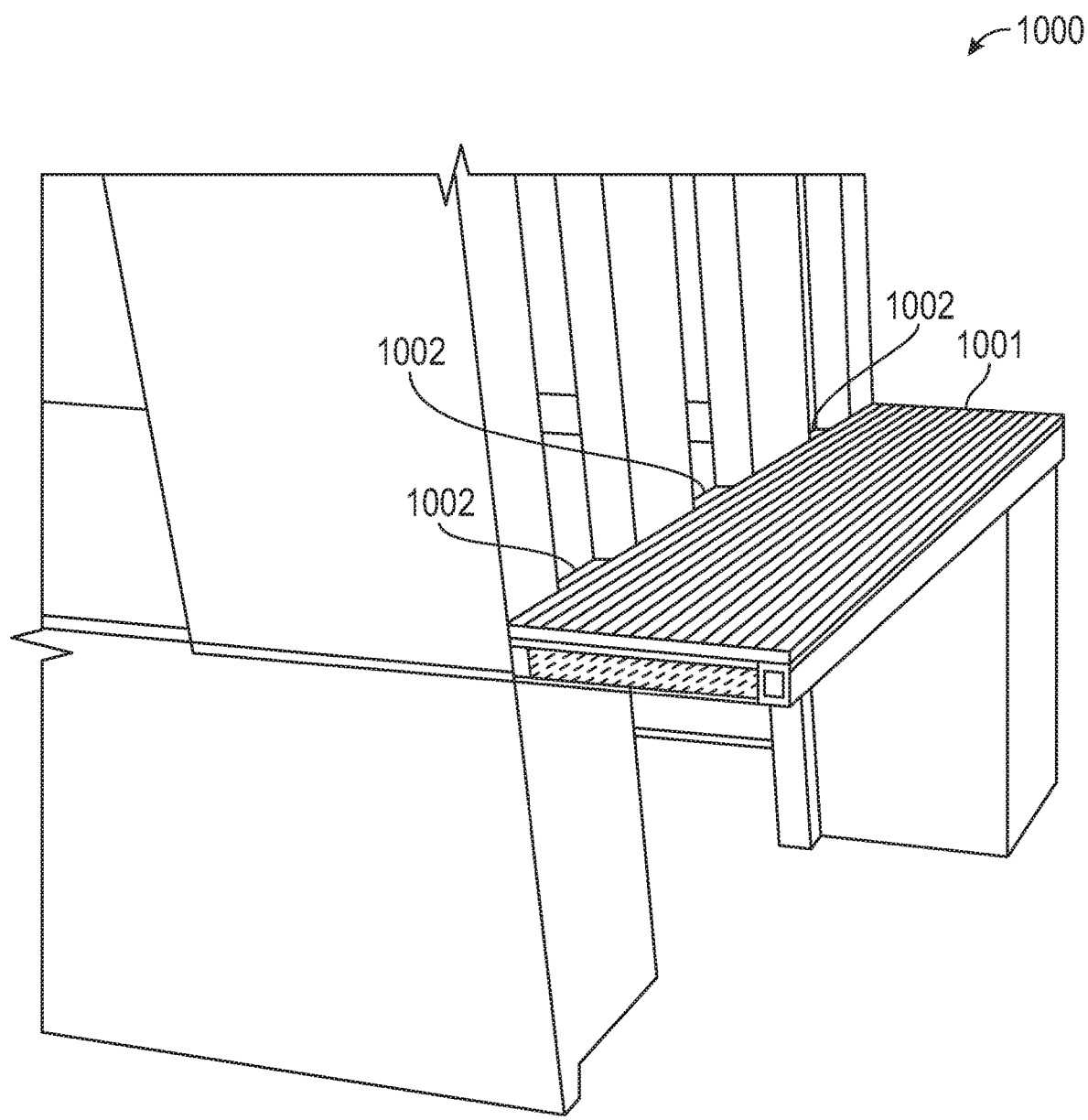
FIG. 10 is a view of a deck assembly according to an embodiment.

Turning to FIG. 10, for multiple story structures 1000, deck assemblies 1001 may be used with the present design. Unlike the floor forms, deck assemblies 1001 are suspended and become both floors and ceilings. Deck assemblies 1001 are conceptually the same panels as those used for the wall systems, except that deck assemblies 1001 are installed horizontally and the connections are modified, as shown in FIG. 10. Additionally, the steel reinforcing in the deck assembly 1001 may be increased in gauge to carry the deck loads. Likewise, skin panel 109 may be thicker and stronger. This provides additional strength during pouring and setting of the concrete. For large spans, it is contemplated that temporary supports are provided during pouring and until the concrete sets. Skin panel 109 forms the ceiling of a given room. Outer skin or external coating 101 forms the floor of a given room and may further comprise suitable flooring products or coatings. Foam panels 108 may be installed at increased thickness to reduce weight while maintaining structural capability, reduce noise, and improve thermal insulation.

As shown in FIG. 10, deck assemblies 1001 are attached to wall assemblies. In one embodiment, a deck assembly support mount 1002 is welded into selected fusion bars 104 of wall assemblies 100 using 90 degree rebar #5-#14 to penetrate the wall panel and deck panel for a connection 4' on center. In one embodiment, deck assembly support mount 1002 is clipped into rebar rods 105 prior to pouring concrete. In another embodiment, a stabbing mount is inserted into the fusion bars 104 of the deck assembly 1001. The holes in the top of this mount align with bolt holes in fusion bars 104 of insulated, reinforced concrete wall panel 100 and are bolted from the outside of the structure. This design removes the need for deck assembly to rest on deck assembly support mount 1002. Multiple deck assemblies 1001 can be put into place within a structure. Deck assemblies 1001 can be attached together by resting on wall panels and being welded, or as discussed above, fastened with rebar.

Other Structures

Modifications to wall assemblies 100 may be made suitable for interior walls. For example, non-load bearing interior wall assemblies may be fabricated with increased thickness foam panels 108 and decreased thickness concrete panel 102. Wall assemblies presented for interior use can be further reduced in reinforcement elements. For example, steel fusion bars 104 can be substituted with wood or plastic or other suitable material. Alternatively or additionally, rebar rods 105 and rebar or wire mesh mat 103 can be significantly lower gauge or removed. In one embodiment, interior wall assemblies can be attached to floor forms assembly through stabbing floor mounts that stab into fusion bars 104 or the substitute for the columns.

Structures for predesigned utility distribution systems can be prebuilt into the wall, deck, and roof assemblies in order to minimize onsite installation times and cost. For example, conduit 601 was shown and described herein as illustrated in FIG. 6. The utility distribution systems available include electrical distribution, water distribution, sewage collection systems, low-voltage wiring distribution, and HVAC (Heat Ventilation, and Air Conditioning) distribution.

In conventional residential construction, the utilities are completed by licensed subcontractors according to acceptable building codes and construction timelines. These are subject to inspection at certain hold points, which add delays and cost to a building's construction. The licensed subcontractors traditionally install the distribution utilities at three different time frames in the building cycle. After clearing of the building site but prior to placement of the foundation, contractors install sewer outlets, water inlets, and underground electrical conduits. Next, after completion of the wood framing and the outside sheathing, contractors run electrical wiring, low voltage wiring, internal plumbing, and HVAC lines. To do this, contractors must drill or cut holes through the existing framing and plant cut protectors on the punch through studs, making it a time consuming and expensive process. Work must be halted at each stage for local inspections to occur. Finally, after closure of outside siding and inside sheetrock, installation of exterior fixtures and outlet covers occurs.

The inventions disclosed herein reduces both the time and cost of utility installation because the majority of the process can be prefabricated. Distribution utilities are completed onsite in less time by less expensive semi-skilled labor. It also eliminates subcontractor interfaces that can dramatically lengthen or disrupt the construction schedule because each phase of building need not be delayed due to individual subcontractors. Furthermore, many hold points can be eliminated because the inspections can be verified at the manufacturing facility en masse.

According to one embodiment, utility distribution conduits are preinstalled in wall assemblies 100, deck assemblies, interior wall assemblies, and roof assemblies. Certain conduits can also be run in foundation assemblies. Where two wall panel assemblies 100 are connected, for example, conduits may be provided with couplers either preinstalled, or the conduits are coupler ready. Because concrete is to be poured, connections are usually made prior to pouring. However, for time savings, because concrete pouring can be done in stages, conduit connections can be made at various levels as the concrete is soft setting.

According to one embodiment, conduits are run at various levels within the panel assemblies, and at various depths. For example, electrical conduits may be run closer towards the interior skin panel 109, while the water conduit can be run behind, closer to the plane of fusion bar 104. In one embodiment, utility conduits are run in the space between the plane of fusion bar 104 and skin panel 118. For ease of connections, utility conduits can be run at the top and bottom sections of wall assemblies 100, or the comparable side sections of other panel assemblies. For bottom-run utility conduits, the conduits are connected while the insulated, reinforced concrete wall panel sections are suspended in place by a crane, for example. In one embodiment, skin panel punch out plates are contemplated, where conduit connections can be made through the skin section of a panel assembly after the assemblies have been placed and connected. The punch out section is then patched accordingly after the conduit is connected. For conduits submerged in concrete, junction box access panels may be used. This allows for wiring repair and updates, or water line/sewer clean out as necessary.

The designs disclosed herein can be used to fashion entire structures on-site in a fraction of the time of conventional builds and with lower installed costs. In addition, wall assemblies 100 can also be used as curtain walls for larger structures like large office buildings and skyscrapers. Offsite prefabrication of the panel assemblies may save both time and construction costs. As disclosed herein, preassembled panel assemblies are transported on truck, train, or barge to the jobsite, where they are lifted into place by crane. Several panel assemblies can be transported on one truck, the dimensions of the panel assembly restricted only by the dimensions of the truck and local transport regulations. One truck, for example, can bring to a jobsite enough panel assemblies to build a small structure, such as a one-story home. A larger home may require only two or three trucks. In one embodiment, transportation dimensions of the apparatus of the present disclosure can be reduced still further.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

What is claimed is:

1. An insulated reinforced concrete wall panel, comprising:
    an outer skin coating comprised of at least one of an acrylic resin, ceramic, and titanium;
    a concrete panel;
    a mesh mat;
    at least two fusion bars extending parallel to one another and in a longitudinal direction parallel to the outer skin and interior skin, each comprising a tilt up connection and a steel member at least 20" in length, wherein each fusion bar is disposed within the insulated reinforced concrete wall panel at about 2' on center intervals;
a rebar rod;
one or more wall panel weld plates;
a foam panel; and
an interior skin.

2. The insulated reinforced concrete wall panel of claim 1 wherein the outer skin coating further comprises a hydrophobic element.

3. The insulated reinforced concrete wall panel of claim 1 wherein the outer skin coating is 10 to 16 millimeters thick.

4. The insulated reinforced concrete wall panel of claim 1 wherein the outer skin coating further comprises an acrylic architectural coating formulated with microscopic ceramic spheres.

5. The insulated reinforced concrete wall panel of claim 1 wherein the outer skin coating is mildew and algae resistant.

6. The insulated reinforced concrete wall panel of claim 1 wherein the concrete panel is aerated.

7. The insulated reinforced concrete wall panel of claim 1 wherein the mesh mat further comprises wire welded together in a grid pattern.

8. The insulated reinforced concrete wall panel of claim 1 wherein the mesh mat further comprises welded rebar.

9. The insulated reinforced concrete wall panel of claim 1 wherein the mesh mat further comprises basalt fiber.

10. The insulated reinforced concrete wall panel of claim 1 wherein the mesh mat further comprises steel.

11. The insulated reinforced concrete wall panel of claim 1 wherein the mesh mat further comprises ASTM A185 plain steel welded wire fabric.

12. The insulated reinforced concrete wall panel of claim 1 wherein the mesh mat further comprises rebar arranged in a 6"×6" grid pattern.

13. The insulated reinforced concrete wall panel of claim 1 further comprising one or more furring elements.

14. The insulated reinforced concrete wall panel of claim 1 further comprising one or more spacing elements.

15. The insulated reinforced concrete wall panel of claim 14 wherein the one or more spacing elements are attached to the mesh mat about every 24" on center.

16. The insulated reinforced concrete wall panel of claim 14 wherein the one or more spacing elements are attached to the mesh mat a minimum 2" between surfaces desired to be spaced.

17. The insulated reinforced concrete wall panel of claim 14 wherein the one or more spacing elements are attached to the mesh mat by one or more of a weld, clip, and tie.

18. The insulated reinforced concrete wall panel of claim 1 wherein the mesh mat is embedded in the concrete panel.

19. The insulated reinforced concrete wall panel of claim 1 wherein the mesh mat is attached to at least one fusion bar by threaded spacer bolts.

20. The insulated reinforced concrete wall panel of claim 1 wherein the one or more fusion bars is substantially rectangular.

21. The insulated reinforced concrete wall panel of claim 1 wherein the one or more fusion bars is up to 2" thick.

22. The insulated reinforced concrete wall panel of claim 1 wherein the height of the one or more fusion bars exceeds the height of the concrete panel by about 6".

23. The insulated reinforced concrete wall panel of claim 1 wherein the one or more fusion bars further comprises a steel member that is substantially rectangular and about $318^{th}$ inch gauge thick.

24. The insulated reinforced concrete wall panel of claim 1 wherein the one or more wall panel weld plates attach the insulated reinforced concrete wall panel to one or more footers.

25. The insulated reinforced concrete wall panel of claim 24 wherein the fusion bars are attached to the one or more wall panel weld plates.

26. The insulated reinforced concrete wall panel of claim 1 wherein the one or more wall panel weld plates are attached to one or more weld plates attached to footers.

27. The insulated reinforced concrete wall panel of claim 1 wherein the fusion bars further comprise one or more steel members substantially shaped, when viewed on-edge, in a "t", "+" or "x" shape.

28. The insulated reinforced concrete wall panel of claim 1 wherein the fusion bars further comprise one or more prefabricated holes.

29. The insulated reinforced concrete wall panel of claim 28 wherein the one or more prefabricated holes is between about 0.5-2" in diameter.

30. The insulated reinforced concrete wall panel of claim 28 wherein one of the one or more prefabricated holes is disposed about 6" from one end of one of the fusion bars.

31. The insulated reinforced concrete wall panel of claim 28 wherein the prefabricated holes are disposed about every 4" along the length of the fusion bars.

32. The insulated reinforced concrete wall panel of claim 1 wherein the fusion bars are comprised of at least one of aluminum, titanium, and plastic.

33. The insulated reinforced concrete wall panel of claim 1 further comprising a plurality of fusion bars positioned within the wall panel such that the distance between each fusion bar, measuring horizontally, is at least about 15".

34. The insulated reinforced concrete wall panel of claim 1 wherein the foam panel is comprised of extruded polystyrene or expanded polystyrene.

35. The insulated reinforced concrete wall panel of claim 1 wherein the foam panel comprises at least one of polyurethane foam, cement-bonded wood fiber, cement-bonded polystyrene beads, cellular concrete, plastic foam, and cementitious binder.

36. The insulated reinforced concrete wall panel of claim 1 wherein the foam panel comprises an interconnection means for interconnecting with foam panels.

37. The insulated reinforced concrete wall panel of claim 1 wherein the foam panel further comprises a plurality of groove spaces in which the fusion bars may be disposed.

38. The insulated reinforced concrete wall panel of claim 1 wherein the interior skin is comprised of at least one of cement, fiberboard, and gypsum board.

39. The insulated reinforced concrete wall panel of claim 1 wherein the interior skin is attached to the foam panel by one or more of glue, screws, nuts, bolts, and fasteners.

40. An insulated reinforced concrete wall panel, comprising:
an outer skin coating comprised of at least one of an acrylic resin, ceramic, and titanium;
a concrete panel;
a mesh mat;
a plurality of alternating rebar rods and fusion bars extending parallel to one another and in a longitudinal direction parallel to the outer skin and interior skin, and positioned within the wall panel at about 2' on center intervals, wherein each fusion bar further comprises a tilt up connection and a steel member at least 20" in length;

one or more wall panel weld plates;
a foam panel; and
an interior skin.

41. The insulated reinforced concrete wall panel of claim 40 wherein each rebar rod is connected to a plurality of spacers or rebar chairs substantially in contact with the foam panel such that the plurality of spacers or rebar chairs maintains space between the rebar and the foam panel so that the concrete panel adequately encapsulate the rebar rods.

42. The insulated reinforced concrete wall panel of claim 40 further comprising rebar stirrups comprising high-strength steel wire arranged in a column.

43. An insulated reinforced concrete wall panel assembly, comprising:
   a plurality of insulated reinforced concrete wall panels, each comprising an outer skin coating comprised of at least one of an acrylic resin, ceramic, and titanium, a concrete panel, a mesh mat, at least two fusion bars extending parallel to one another and in a longitudinal direction parallel to the outer skin and interior skin, each comprising a tilt up connection and a steel member at least 20" in length, wherein each fusion bar is disposed within the insulated reinforced concrete wall panel at about 2' on center intervals, a rebar rod, one or more wall panel weld plates, a foam panel, an interior skin and interconnections for mating each insulated reinforced concrete wall panel to one another.

44. The assembly of claim 43 wherein each insulated reinforced concrete wall panel further comprises threaded bolt holes for receiving bolts to achieve interconnection.

45. The assembly of claim 43 further comprising a footer.

46. The assembly of claim 43 further comprising a door frame perforation in at least one concrete panel, wherein the perforation is surrounded by rebar.

47. The assembly of claim 43 further comprising a window frame perforation in at least one concrete panel, wherein the perforation is surrounded by rebar.

48. The assembly of claim 43 further comprising a concrete blind stop.

49. A method of fabricating an insulated reinforced concrete wall panel, comprising the steps of:
   fabricating a plurality of footers;
   fabricating a form in the shape of a wall of desired dimensions on a flat surface;
   fabricating one or more insulated foam panels comprising a plurality of groove spaces in which fusion bars may be disposed;
   arranging the one or more foam panels inside the form;
   assembling, on top of the one or more foam panels, at least two fusion bars extending parallel to one another and in a longitudinal direction parallel to the outer skin and interior skin, each comprising a tilt up connection and a steel member at least 20" in length, wherein each fusion bar is disposed at about 2 on center intervals;
   arranging a mesh mat;
   aligning weld plates to connect the wall panel to the footer;
   pumping concrete into the form until it fills the form to substantially the top of the form;
   curing the concrete;
   removing the forms, elevating the cured panel, and positioning a desired location;
   welding the cured panel to the plurality of footers;
   applying an interior skin comprising at least one of cement, fiberboard and sheetrock; and
   applying an outer skin comprised of at least one of an acrylic resin, ceramic, and titanium.

* * * * *